June 20, 1944.  A. G. TEN EYCK  2,352,136

SPEED REGULATOR

Filed Oct. 19, 1942

INVENTOR.
Andrew G. Ten Eyck
BY Edward M. Apple
ATTY

Patented June 20, 1944

2,352,136

UNITED STATES PATENT OFFICE 2,352,136

SPEED REGULATOR

Andrew G. Ten Eyck, Detroit, Mich.

Application October 19, 1942, Serial No. 462,461

3 Claims. (Cl. 267—1)

This invention relates to speed regulating devices and has particular reference to a device for controlling the speed of automobiles.

An object of the invention is the provision of a device of the character referred to, which may be employed with the accelerator pedal of an automobile, to limit the downward movement of the pedal.

Another object of the invention is the provision of a device of the character referred to, for limiting the power output of an automobile, and which will permit the operator to utilize additional power, when it becomes necessary to pass another car, climb a hill, or meet any other emergency.

Another object of the invention is the provision of a device of the character referred to which may be readily adjusted to different speed and power conditions.

Another object of the invention is the provision of a device which enables the driver of a car to maintain a predetermined speed, without the necessity of looking at the speed indicator on the dashboard, thereby promoting safety in driving.

Another object of the invention is the provision of a device which will enable the operator to maintain a constant speed, thereby saving tires, gasoline, and wear and tear on the automobile.

Another object of the invention is the provision of a device which may be employed in breaking in a new automobile.

Another object of the invention is the provision of a device of the character referred to which is simple in construction, economical to manufacture, and easy to install and adjust, for use on any type of automobile.

The foregoing and other objects and advantages of the invention will appear as the description proceeds, reference being made from time to time to the accompanying drawing forming a part of the within disclosure in which drawing.

The invention resides in the particular combination and arrangement of parts as hereinafter described, it being understood that certain modifications and changes may be made, all of which are intended to be within the scope of the appended claims.

Figure 2:
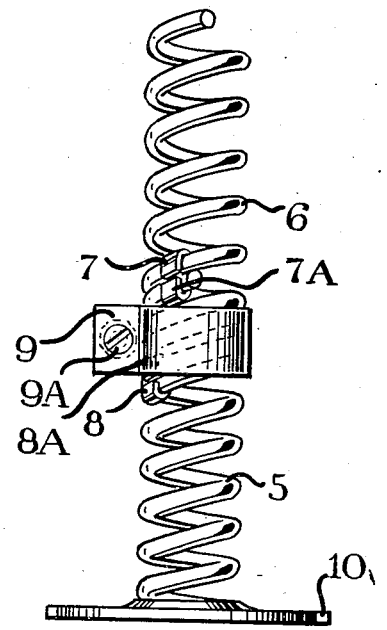
Fig. 2 is an enlarged detail of my speed regulating device in extended condition.
Figure 3:
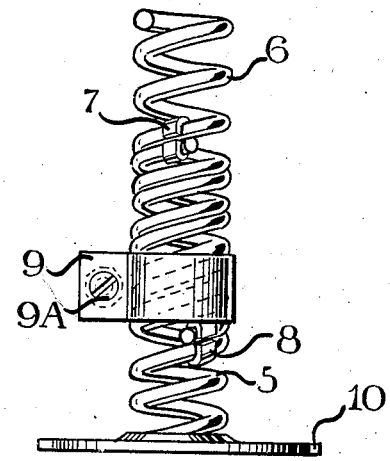
Fig. 3 is an enlarged detail of the device illustrated in Fig. 2 but in contracted position.

Referring now more particularly to the drawing it will be understood that in the embodiment herein disclosed, my improved speed regulating device consists of a pair of identical springs 5 and 6, which are arranged with their convolutions co-acting together. It will be noted (Fig. 2) that the convolutions, comprising the upper section of the spring 5, are adapted to cooperate with the convolutions comprising the lower section of spring 6, so that the co-acting convolutions are in surface contact throughout their working area. This enables the device to be lengthened or shortened by rotating one of the springs while holding the other stationary.

In order to permit the longitudinal adjustment of one spring with reference to the other and to hold the springs in alignment,, I prefer to use clips 7 and 8, which are adapted to encircle the bodies of the metal comprising the springs 5 and 6, as shown in the drawing. The clip 7 is secured by soldering or spot-welding, or by similar means, to the upper end of the spring 5, as at 7A, and the clip 8 is secured by similar means to the lower end of the spring 6, as at 8A. Inasmuch as the clips 7 and 8 are respectively secured only to one of the springs, the other springs will be free to move through the clips, so that it will be possible to move one spring with reference to the other in the same manner as threaded elements are moved with reference to each other.

In order to further assist in the alignment of the springs 5 and 6, and in order to lock the springs against relative movement with reference to each other, I provide a clamp 9, which encircles the outside peripheries of the springs 5 and 6 in their contacting areas, which areas are defined generally as being positioned between the clips 7 and 8, regardless of the positions assumed by the clips 7 and 8 in the various degrees of adjustment. Tension on the clamp 9 is obtained by means of the bolt 9A, whereby the springs 5 and 6 may be locked in position.

Figure 1:
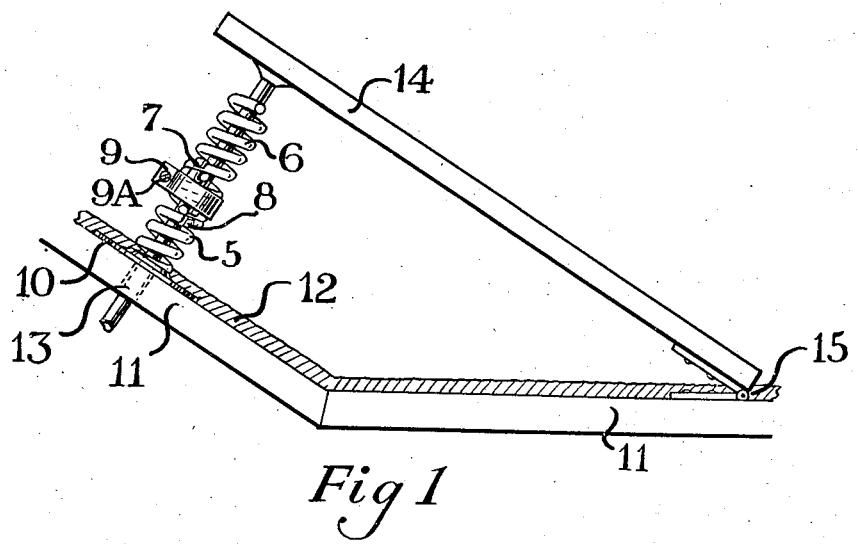
Fig. 1 is a fragmentary detail of a section of an automobile floorboard showing my speed regulating device in position, ready for use with the accelerator pedal.

The assembly hereinabove described is secured to a perforated base member 10 by any suitable means. The perforated base member 10, as shown in Fig. 1, is adapted to be supported on the floorboard 11 of an automobile and is adapted to be covered by the floor mat 12. The pushrod 13, which is secured to the accelerator pedal 14, extends through the center of the coil springs 5 and 6 and further assists in holding the springs 5 and 6 in alignment. The accelerator pedal 14, as in conventional practice, is hinged as at 15 to the floorboard 11.

The operation of the device is as follows:

Having assembled the device in conjunction with the accelerator pedal and the floorboard of an automobile as shown in Fig. 1, the spring 5 or 6 is rotated, so that the proper adjustment of the overall length of the springs is obtained, to provide a stop for the downward movement of the accelerator pedal 14. The length of this stop is determined by the downward distance which it is necessary to move the accelerator pedal 14, to provide the normal speed desired. It is obvious that the operator of the accelerator pedal will know he has reached his normal driving speed when the accelerator pedal is depressed to the point of contact with the upper end of the spring 6. This condition will be arrived at through the usual pressure being applied on the accelerator pedal.

There are times, however, when additional power must be instantaneously available to meet such an emergency as passing another car, climbing a hill, or the like. The power needed for meeting such an emergency may be readily obtained by simply exerting sufficient pressure on the accelerator pedal 14, to overcome the resistance of the springs 5 and 6. It is obvious therefore that with this device I have provided a stop for the downward movement of the accelerator pedal for normal driving, and at the same time have provided a means whereby the maximum power of the engine is immediately available for use.

Having described my invention, what I claim and desired to secure by Letters Patent is:

1. A speed control device of the character described comprising a pair of identical coil springs having their end convolutions in engagement, and means to hold the said convolutions in predetermined relation, said last named means comprising an adjustable band encircling said springs along the area of their engagement.

2. In a device of the character described, the combination of a pair of identical springs arranged with their end convolutions in engagement, and a clip secured to each spring near one end and arranged to slidably engage the body of the other spring, to hold the said springs in alignment.

3. The combination defined in claim 2, including an adjustable band arranged about the engaging area of said springs and adapted to lock the said springs against individual rotation.

ANDREW G. TEN EYCK.